United States Patent [19]
Badley

[11] Patent Number: 5,852,144
[45] Date of Patent: Dec. 22, 1998

[54] CATALYST COMPOSITIONS AND CATALYTIC PROCESSES

[75] Inventor: Rickey D. Badley, Dewey, Okla.

[73] Assignee: Phillips Petroleum Company, Bartlesville, Okla.

[21] Appl. No.: 928,031

[22] Filed: Sep. 11, 1997

Related U.S. Application Data

[63] Continuation of Ser. No. 144,751, Oct. 27, 1993, abandoned.

[51] Int. Cl.$^6$ ........................................................ C08F 4/24
[52] U.S. Cl. ........................ 526/128; 526/105; 526/106; 526/129; 526/130; 526/348.4; 526/348.5; 502/120; 502/237
[58] Field of Search ..................................... 526/105, 106, 526/128, 129, 130, 348.4, 348.5

[56] References Cited

U.S. PATENT DOCUMENTS

| | | | |
|---|---|---|---|
| 3,135,809 | 6/1964 | Bosmajian | 260/650 |
| 4,206,297 | 6/1980 | Hoff et al. | 526/106 |
| 4,301,034 | 11/1981 | McDaniel | 252/452 |
| 4,454,293 | 6/1984 | McDaniel | 526/106 |
| 4,547,557 | 10/1985 | McDaniel | 526/106 |
| 4,560,733 | 12/1985 | Sturdy et al. | 526/129 |
| 4,981,927 | 1/1991 | Rekers et al. | 526/105 |

OTHER PUBLICATIONS

"Controlled Growth of Monodisperse Silica Spheres in the Micron Size Range", Journal of Colloid and Interface Science 26, pp. 62–69 (1968).

"Surface Modification of Colloidal Silica", Langmuit, vol. 6, No. 4, pp. 798–801 (1990).

Journal of Non–Crystalline Solids 63 (1984) pp. 45–59 North Holland, Amsterdam, C.J. Brinkler, K.D. Keefer, D.W. Schaefer, R.A. Assink, B.D. Kay and C.S. Ashley, "Sol–Gel Transition in Simple Silicates".

*Primary Examiner*—David W. Wu
*Attorney, Agent, or Firm*—Carl D. Corvin

[57] ABSTRACT

Catalyst compositions are provided that comprise (a) discrete silica particles; (b) chromium; and (c) a support comprising silica. These composition are useful in polymerizing ethylene or copolymerizing ethylene with a comonomer and provide better control over the molecular weight and the molecular weight distribution of a resulting polymer.

9 Claims, No Drawings

CATALYST COMPOSITIONS AND CATALYTIC PROCESSES

This application is a File Wrapper Continuation of application Ser. No. 08/144,751, filed Oct. 27, 1993, now abandoned.

BACKGROUND OF THE INVENTION

This invention is related to the field of catalyst compositions and catalytic processes.

The molecular weight of an ethylene polymer composition can greatly influence the physical properties of the composition. For example, the molecular weight of an ethylene polymer composition influences the chemical resistance, permeability, environmental stress crack resistance, tensile strength, stiffness, toughness and melt strength, of the composition. Since the molecular weight of an ethylene polymer composition is important to the physical properties of the polymer it is important to be able to control the molecular weight of the polymer.

SUMMARY OF THE INVENTION

It is an object of this invention to provide catalyst compositions and catalytic processes.

It is another object of this invention to provide catalyst compositions that are useful in homopolymerizing ethylene or copolymerizing ethylene with a comonomer.

It is another object of this invention to provide catalyst compositions that are useful in controlling the molecular weight of an ethylene polymer composition when homopolymerizing ethylene or copolymerizing ethylene with a comonomer.

In accordance with this invention a catalyst composition is provided comprising:

(a) discrete silica particles;
(b) chromium; and
(c) a support comprising silica.

These and other objects, features, aspects, and advantages of this invention will become better understood with reference to the following detailed description of the invention and the claims.

DETAILED DESCRIPTION OF THE INVENTION

In general, the catalyst compositions of this invention comprise discrete silica particles, chromium, and a catalyst support. The term "support" is not meant to be construed as an inert component of the catalyst compositions of this invention.

Discrete Silica Particles

In general, a colloidal suspension that comprises discrete silica particles is produced by contacting together a tetraalkoxysilane composition, an alcohol composition, an ammonia composition, and water. In general, the procedures disclosed by Stober, Fink, and Bohn in *Controlled Growth of Monodispersed Silica Spheres in the Micron Size Range,* Journal of Colloid and Interface Science, volume 26, pages 62–69, (1968) can be used to form a colloidal suspension that comprises discrete silica particles. Additionally, the procedures disclosed by Badley, Ford, McEnroe, and Assink in *Surface Modification of Colloidal Silica,* Langmuir, volume 6, number 4, pages 792–801 (1990) can also be used to form a colloidal suspension that comprises discrete silica particles. These articles are hereby incorporated by reference.

In general, the tetraalkoxysilane compositions useful in this invention have the general formula $(RO)_4Si$ wherein each R group is independently selected from the group consisting of linear and branched chained alkyl groups. These linear and branched chained alkyl groups can have from 1 to about 6 carbon atoms in their molecular structure. It is preferred if the alkyl group is linear and saturated. It is further preferred if the tetraalkoxysilane composition is substantially soluble in the hereafter described alcohol composition. Suitable examples of tetraalkoxysilane compositions useful in this invention are:

tetramethoxysilane $[(CH_3O)_4Si]$;
tetraethoxysilane $[(CH_3CH_2O)_4Si]$;
tetrapropoxysilane $[(CH_3(CH_2)_2O)_4Si]$
tetrabutoxysilane $[(CH_3(CH_2)_3O)_4Si]$
tetrapentoxysilane $[(CH_3(CH_2)_4O)_4Si]$; and
tetrahexyloxysilane $[(CH_3(CH_2)_5O)_4Si]$.

Additionally, mixtures of these tetraalkoxysilane compounds can be used in this invention.

The alcohol compositions useful in this invention have the general formula $C_nH_{(2n+2-x)}(OH)_x$ wherein n is an integer from 1 to about 6 and x is an integer from 1 to about 14. These alcohol compounds can be linear or branched chained alcohol compounds. It is preferred that the alcohol compounds be linear. Suitable examples of alcohol compounds are methanol, ethanol, propanol, butanol, pentanol and hexanol. Additionally, mixtures of these alcohol compounds can be used in this invention.

The ammonia compositions useful in this invention are those that have a pH greater than about seven. Suitable examples are ammonia gas that has been dissolved in an alcohol and ammonium hydroxide.

In general, the molar ratio of tetraalkoxysilane composition:water:ammonia composition is from about 1:0.1:0.1 to about 1:1000:1000. It is preferred that the molar ratio is from about 1:0.5:0.3 to about 1:850:400.

Catalyst Compositions

After the colloidal suspension of discrete silica particles is formed it can be contacted with either:

(a) a catalyst support that has been precontacted with a chromium compound; or
(b) a catalyst support that has not been precontacted with a chromium compound.

If the colloidal suspension of discrete silica particles is to be contacted with a catalyst support that has been precontacted with a chromium compound, then the colloidal suspension should be contacted with an alcohol soluble chromium compound to form a chromium/silica colloidal suspension. The chromium containing catalyst support is then contacted with the chromium/silica colloidal suspension by any manner known in the art to form a wetted support. The wetted chromium containing catalyst support is then dried. This contacting-drying procedure can be repeated until the desired amount of discrete silica particles and chromium is deposited on the chromium containing catalyst support.

Generally, it is desirable if about 0.25 to about 5 weight percent of chromium is present in the catalyst composition. However, it is preferred if from about 0.4 to about 1 weight percent is present. The weight percent is based on the initial weight of the catalyst Ssupport and discrete silica particles before addition of any chromium. The amount of discrete silica particles deposited on the catalyst support is from about 1 to about 100 weight percent based on the initial weight of the catalyst support. It is preferable if the amount of discrete silica particles is from about 25 weight percent to about 75 weight percent.

If the colloidal suspension of discrete silica particles is to be contacted with a catalyst support that has not been precontacted with a chromium compound, then the colloidal suspension does not need to be contacted with an alcohol soluble chromium compound to form a chromium/silica colloidal suspension. The colloidal suspension of discrete silica particles can be contacted with the support in any manner known in the art to produce a wetted support. The wetted support is then dried. This contacting-drying procedure can be repeated until the desired amount of discrete silica particles is deposited on the catalyst support.

The amount of discrete silica particles deposited on the catalyst support is from about 1 to about 100 weight percent based on the initial weight of the catalyst support. It is preferable if the amount of discrete silica particles is from about 25 weight percent to about 75 weight percent. The weight percent is based on the initial weight of the catalyst support before to addition of any discrete silica particles.

After the desired amount of discrete silica particles is deposited on the support, the discrete silica particles/support composition should be contacted with a chromium containing composition. Generally, it is desirable if about 0.25 to about 5 weight percent of chromium is present in the catalyst composition. However, it is preferred if from about 0.4 to about 1 weight percent is present. The weight percent is based on the initial weight of the catalyst support and discrete silica particles before addition of any chromium. The chromium can be contacted with the discrete silica particles/support composition in any manner known in the art. Suitable examples are disclosed in U.S. Pat. Nos. 3,900,457; 4,081,407; 4,392,990; 4,405,501; 4,735,931; and 4,981,831; the disclosures of which are hereby incorporated by reference.

The catalyst supports used in this invention generally comprise about 80 to 100 weight percent silica. The remainder, if any, being selected from the group consisting of refractory metal oxides, such as alumina, boria, magnesia, thoria, zirconia titania, and mixtures thereof. A preferred catalyst support consists essentially of silica and titania. The catalyst supports can be prepared by any manner known in the art. Suitable methods are disclosed in the above identified patents.

After the discrete silica particles/chromium/support composition is formed it can then be activated. In general, activation occurs when the chromium containing composition is contacted with an oxygen containing ambient. This contacting should take place at a temperature of about 300 degrees Celsius to about 1000 degrees Celsius. However, temperatures in the range of about 600 to 950 degrees Celsius are preferred.

After this activation, the activated discrete silica particles/chromium/support composition is the catalyst system used in this invention. It can be used to homopolymerize ethylene or copolymerize ethylene with a comonomer. This polymerization can be carried out in any manner known in the art such as gas phase, solution or slurry polymerization conditions. A stirred reactor can be utilized for a batch process or the reaction can be carried out continuously in a loop reactor.

A preferred polymerization technique is that which is referred to as particle form or slurry process wherein the temperature is kept below the temperature at which the polymer goes into solution. Such polymerization techniques are well known in the art and are disclosed, for instance, in Norwood, U.S. Pat. No. 3,248,179, the entire disclosure of which is hereby incorporated by reference. Two preferred polymerization methods for the slurry process are those employing a loop reactor of the type disclosed in Norwood and those utilizing a plurality of stirred reactors either in series, parallel, or combinations thereof wherein the reaction conditions are different in the separate reactors. It is possible to copolymerize ethylene with another olefin (comonomer) during this polymerization. Suitable examples of copolymerizable olefins are propylene, 1-butene, 3-methyl-1-butene, 1-pentene, 3-methyl-1-pentene, 4-methyl-1-pentene, 1-hexene, 3-ethyl-1-hexene, 1-octene, 1-decene, and mixtures of two or more olefins. Currently, 1-hexene is a preferred comonomer to use with ethylene to form a copolymer.

EXAMPLE

This example is provided to further assist a person skilled in the art with understanding this invention. The particular components, conditions, reactants, temperatures and the like are meant to be illustrative of the invention and are not meant to be construed as limiting the invention.

The following catalyst compositions were used in this example for comparison purposes.

[1] Catalyst A was a composition comprising discrete silica particles. This catalyst composition also contained about 1 weight percent chromium based on the weight of the discrete silica particles. This catalyst composition was prepared by contacting:

(1) 30 milliliters of a chromium acetate solution (0.73 grams chromium acetate in methanol); with (2) 279 milliliters of a colloidal suspension of discrete silica particles (this colloidal suspension was prepared in accordance with the procedure disclosed below); to form a catalyst mixture.

Thereafter, 186 milliliters of this catalyst mixture was dried to give the unactivated catalyst composition. This unactivated catalyst composition was then activated by subjecting it to air at a temperature of 800° C. for a period of three hours.

[2] Catalyst B was a composition comprising silica. This composition also contained about 1 weight percent chromium based on the weight of the silica. This catalyst was prepared using a Davison 952 silica composition that was purchased from the Davison Chemical Division of the W. R. Grace Corporation. This 952 silica composition was impregnated with chromium by contacting the 952 silica composition with a chromium acetate solution (chromium acetate in methanol) until the 952 silica composition contained about 1 weight percent chromium based on the weight of the 952 silica composition. This chromium/952 silica composition was then dried at 75° C. to form the unactivated catalyst composition. This unactivated catalyst composition was then activated by subjecting it to air at a temperature of 800° C. for a period of three hours.

[3] Catalyst C was a Davison Magnapore unactivated catalyst composition comprising silica/titania. This inactivated catalyst composition also contained about 1 weight percent chromium based on the weight of the silica/titania. It was purchased from the Davison Chemical Division of the W. R. Grace Corporation. This unactivated catalyst composition was then activated by subjecting it to air at a temperature of 800° C. for a period of three hours.

Additionally, some of the catalyst compositions below used a Davison Cogel composition comprising silica/titania. This composition was purchased from the Davison Chemical Division of the W. R. Grace Corporation.

Preparation of a Colloidal Suspension that has Discrete Silica Particles

To a one liter round bottom flask the following compounds were added:

[1] 368 milliliters of methanol;
[2] 9.7 milliliters of water; and
[3] 13 milliliters of ammonium hydroxide While stirring this mixture, 100 milliliters (0.45 moles) of tetraethoxysilane $[(CH_3CH_2O)_4Si]$ was added to the mixture. This produced a mixture that had 0.39 moles/liter of ammonium and 1.96 moles/liter of water. The flask was then stoppered and the mixture was continuously stirred. After 45 minutes the mixture began to turn cloudy as the discrete silica particles began to form. After stirring for 24 hours, a light blue dispersion was obtained. This suspension contained about 27 grams of discrete silica particles.

Preparation of the Catalyst Compositions of this Invention

The catalysts compositions of this invention were prepared as follows.

[1] Catalyst AB1 was prepared as follows. A colloidal suspension of discrete silica particles containing 27 grams of discrete silica particles per 500 milliliter of methanol was prepared in a manner similar to that above. This colloidal suspension was then added to a Davison 952 silica composition until the 952 silica composition was completely wetted with the colloidal suspension. The wetted 952 silica composition was then vacuum dried at 70° C. This procedure was repeated until there was 25 weight percent of discrete silica particles on the 952 silica composition based on the weight of the 952 silica composition. Thereafter, this 952 silica/discrete silica composition was contacted with a chromium acetate solution so that the 952 silica/discrete silica composition contained about 1 weight percent chromium based on the weight of the 952 silica/discrete silica composition thereby producing the unactivated catalyst composition. This unactivated catalyst composition was then activated by subjecting it to air at a temperature of 800° C. for a period of three hours.

[2] Catalyst AB2 was prepared in a manner similar to catalyst AB1 except that there was 50 weight percent of discrete silica particles on the 952 silica composition.

[3] Catalyst AB3 was prepared in a manner similar to catalyst AB1 except that there was 75 weight percent of discrete silica particles on the 952 silica composition.

[4] Catalyst AC1 was prepared as follows. A colloidal suspension of discrete silica particles was prepared in a manner similar to that above. Chromium acetate was then added to the colloidal suspension so that there was about 1 weight percent chromium based on the weight of the silica in the colloidal suspension, thereby producing a chromium/silica colloidal suspension. This chromium/silica suspension was then added to a Davison Magnapore unactivated catalyst composition until it was completely wetted with the chromium/silica colloidal suspension. The Magnapore catalyst composition was then vacuum dried at 50° C. This procedure was repeated until there was 25 weight percent of discrete silica particles on the Magnapore catalyst composition based on the weight of the Magnapore catalyst composition. This unactivated catalyst composition was then activated by subjecting it to air at a temperature of 800° C. for a period of three hours.

[5] Catalyst AC2 was prepared in a manner similar to catalyst AC1 except that the weight percent of discrete silica particles on the Magnapore catalyst composition was 50 weight percent.

[6] Catalyst AC3 was prepared in a manner similar to catalyst AC1 except that the weight percent of discrete silica particles on the Magnapore catalyst composition was 75 weight percent.

[7] Catalyst AD1 was prepared in a manner similar to catalyst AB1 except that a Davison Cogel composition was used instead of a Davison 952 silica composition.

Polymerizing with the Above Catalyst Compositions

A polymerization reactor having an internal volume of about 2.6 liters was purged with nitrogen at a temperature of about 105° C. for about 25 minutes so that substantially all of the air and water was removed from the reactor. The reactor was then flushed with isobutane to substantially remove all of the nitrogen. Under an isobutane purge the catalyst was added to the reactor. The reactor was then heated to the desired polymerization temperature. In Runs 9 and 12 enough hydrogen was then added to pressure the reactor to 25 psig. Thereafter, 600 milliliters of isobutane was added to the reactor. In Runs 3–4, 7–14, and 21, one milliliter of a cocatalyst solution containing 0.5 weight percent triethylaluminum based on the weight of the cocatalyst solution was added to the reactor. Thereafter, 600 milliliters of isobutane was added to the reactor. In Runs 1, 6, 16, 18, and 20, 30 milliliters of 1-hexene was added to the reactor. The reactor was then pressurized to 550 psig with ethylene. This pressure was maintained during the polymerization. Thereafter, the product, if any, was removed from the reactor. The results of these Runs are in Table One.

TABLE ONE

| RUN | CAT[1] | PT[2] | TEA[3] | HEX[4] | H[5] | ACT[6] | HLMI[7] | Mw[8]/Mn |
|---|---|---|---|---|---|---|---|---|
| 1 | A | 95 | N | Y | N | 0 | — | |
| 2 | A | 105 | N | N | N | 56 | 14.96 | |
| 3 | B | 105 | Y | N | N | 3980 | 25.21 | 9.7 |
| 4 | C | 105 | Y | N | N | 11040 | 55.72 | |
| 5 | C | 105 | N | N | N | 5312 | 120.2 | |
| 6 | C | 95 | N | Y | N | 8028 | 90.5 | |
| 7 | AB1 | 105 | Y | N | N | 3751 | 7.9 | 10.7 |
| 8 | AB1 | 100 | Y | N | N | 4011 | 2.88 | |
| 9 | AB1 | 105 | Y | N | Y | 2610 | 14.93 | |
| 10 | AB2 | 105 | Y | N | N | 5480 | 2.69 | 13.9 |
| 11 | AB2 | 100 | Y | N | N | 4810 | 1.12 | |
| 12 | AB2 | 105 | Y | N | Y | 2330 | 7.92 | |
| 13 | AB3 | 105 | Y | N | N | 2620 | 1.3 | 14.0 |
| 14 | AC1 | 105 | Y | N | N | 10750 | 27.66 | |
| 15 | AC1 | 105 | N | N | N | 5678 | 76.9 | |
| 16 | AC1 | 95 | N | Y | N | 5908 | 64.08 | |
| 17 | AC2 | 105 | N | N | N | 4266 | 59.61 | |
| 18 | AC2 | 95 | N | Y | N | 2964 | 22.49 | |
| 19 | AC3 | 105 | N | N | N | 1913 | 22.75 | |
| 20 | AC3 | 95 | N | Y | N | 2672 | 11.53 | |
| 21 | AD1 | 105 | Y | N | N | 8689 | 28.69 | |
| 22 | AD1 | 105 | N | N | N | 5117 | 91.5 | |

[1]Type of Catalyst
[2]Polymerization Temperature °C.
[3]Was Triethyialuminum Added? Yes or No
[4]Was 1-Hexene Added? Yes or No
[5]Was Hydrogen Added? Yes or No
[6]The Activity in Grams Polymer/Gram Catalyst Composition/Hr.
[7]The High Load Melt Index Measured in Accordance with ASTMD 1238 (Unit = g/10 Minutes)
[8]Mw/Mn was determined using size exclusion chromatograph data. This data was obtained with a Waters 150 C chromatograph at 140° C. using 1,2,4 trichlorobenzene as a solvent. Mw is the weight average molecular weight, Mn is the number average molecular weight.

As can be seen from the results in Table One, high activities can be obtained. Furthermore, increased control over the molecular weight can be obtained by changing the amount of discrete silica particles in the catalyst composition. Additionally, by changing the amount of discrete silica particles in the catalyst composition, the molecular weight distribution (Mw/Mn) can be controlled.

Although the present invention has been described in considerable detail with reference to certain preferred embodiments thereof, other versions are possible. Therefore, the spirit and scope of the appended claims should not be limited to the description of the preferred embodiments contained herein.

That which is claimed is:

1. A process comprising homopolymerizing ethylene or copolymerizing ethylene and a comonomer with a catalyst composition comprising:
    (a) discrete silica particles, wherein said discrete silica particles are produced by the process consisting essentially of contacting together, in the absence of an acid, a tetraalkoxysilane composition, an alcohol composition, an ammonia composition, and water;
    (b) chromium; and
    (c) a support that comprises silica.

2. A process comprising homopolymerizing ethylene or copolymerizing ethylene and a comonomer with a catalyst composition that is produced by a process comprising:
    (a) producing a mixture that comprises discrete silica particles and chromium wherein said discrete silica particles are produced by the process consisting essentially of contacting together, in the absence of an acid, a tetraalkoxysilane composition, an alcohol composition, an ammonia composition, and water;
    (b) contacting said mixture with a composition that comprises
        (1) chromium and
        (2) a support that comprises silica to form said catalyst composition.

3. A process comprising homopolymerizing ethylene or copolymerizing ethylene and a comonomer with a catalyst composition that is produced by a process comprising:
    (a) producing a mixture that comprises discrete silica particles, wherein said discrete silica particles are produced by the process consisting essentially of contacting together, in the absence of an acid, a composition, and water; and then
    (b) contacting said mixture with a support that comprises silica to form a composition that comprises said discrete silica particles and said support; and then
    (c) contacting said composition that comprises said discrete silica particles and said support with chromium to form said catalyst composition.

4. A process according to claim 1 wherein said catalyst composition comprises about 25 to about 75 weight percent discrete silica particles where the weight is based on the weight of said support.

5. A process according to claim 1 wherein said support comprises silica and titania.

6. A process according to claim 2 wherein said catalyst composition comprises about 25 to about 75 weight percent discrete silica particles where the weight percent is based on the weight of said support.

7. A process according to claim 2 wherein said support comprises silica and titania.

8. A process according to claim 3 wherein said catalyst composition comprises about 25 to about 75 weight percent discrete silica particles where the weight percent is based on the weight of said support.

9. A process according to claim 3 wherein said support comprises silica and titania.

* * * * *